(12) United States Patent
Refai et al.

(10) Patent No.: US 9,423,682 B2
(45) Date of Patent: Aug. 23, 2016

(54) ULTRA HIGH-RESOLUTION VOLUMETRIC THREE-DIMENSIONAL DISPLAY

(71) Applicant: 3DIcon Corporation, Tulsa, OK (US)

(72) Inventors: Hakki H. Refai, Bixby, OK (US);
George Melnik, Montrose, NY (US);
Mark Willner, Denver, CO (US)

(73) Assignee: 3DIcon Corporation, Tulsa, OK (US)

( * ) Notice: Subject to any disclaimer, the term of this patent is extended or adjusted under 35 U.S.C. 154(b) by 79 days.

(21) Appl. No.: 14/312,569

(22) Filed: Jun. 23, 2014

(65) Prior Publication Data

US 2015/0029315 A1    Jan. 29, 2015

Related U.S. Application Data

(60) Provisional application No. 61/859,145, filed on Jul. 26, 2013.

(51) Int. Cl.
| | |
|---|---|
| *G03B 21/26* | (2006.01) |
| *H04N 13/04* | (2006.01) |
| *H04N 13/02* | (2006.01) |
| *G03B 35/20* | (2006.01) |
| *G02B 27/22* | (2006.01) |
| *G09G 3/00* | (2006.01) |
| *G09G 3/02* | (2006.01) |

(52) U.S. Cl.
CPC ............ *G03B 21/26* (2013.01); *G02B 27/2271* (2013.01); *G02B 27/2292* (2013.01); *G03B 35/20* (2013.01); *H04N 13/0253* (2013.01); *H04N 13/0427* (2013.01); *H04N 13/0493* (2013.01); *H04N 13/0495* (2013.01); *H04N 13/0497* (2013.01); *G09G 3/003* (2013.01); *G09G 3/025* (2013.01)

(58) Field of Classification Search
CPC .......... H04N 13/0427; H04N 13/0495; H04N 13/049; H04N 13/0493; H04N 13/0253; H04N 13/0497; G03B 21/26; G03B 35/20; G02B 27/2271; G02B 27/2292; G09G 3/003; G09G 3/025
See application file for complete search history.

(56) References Cited

U.S. PATENT DOCUMENTS

| | | | | |
|---|---|---|---|---|
| 5,684,621 | A * | 11/1997 | Downing | G02B 27/2271 348/E13.022 |
| 7,858,913 | B2 | 12/2010 | Refai et al. | |
| 8,075,139 | B2 | 12/2011 | Refai et al. | |
| 8,247,755 | B2 | 8/2012 | Refai et al. | |
| 2009/0179852 | A1* | 7/2009 | Refai | G09G 3/001 345/107 |
| 2011/0316958 | A1* | 12/2011 | Johno | B41J 2/473 347/224 |

OTHER PUBLICATIONS

Hakki H. Refai, Member, IEEE, "Static Volumetric Three-Dimensional Display", pp. 391-397, Journal of Display Technology, vol. 5, No. 10, Oct. 2009.

* cited by examiner

*Primary Examiner* — Sultan Chowdhury
*Assistant Examiner* — Magda Cruz
(74) *Attorney, Agent, or Firm* — Blakely, Sokoloff, Taylor & Zafman LLP

(57) ABSTRACT

An ultra high-resolution volumetric three-dimensional (3D) display system comprises an image chamber, and an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image.

22 Claims, 11 Drawing Sheets

ULTRA HIGH-RESOLUTION VOLUMETRIC THREE-DIMENSIONAL DISPLAY

CROSS-REFERENCE TO RELATED APPLICATIONS

The present application claims priority to U.S. Application No. 61/859,145, filed Jul. 26, 2013 and is related to U.S. patent application Ser. No. 11/789,767, filed Apr. 25, 2007, which has issued as U.S. Pat. No. 7,858,913; U.S. patent application Ser. No. 12/950,716, filed Nov. 19, 2010, which has issued as U.S. Pat. No. 8,075,139; U.S. patent application Ser. No. 13/289,487, filed Nov. 4, 2011, which has issued as U.S. Pat. No. 8,247,755, and U.S. patent application No. 20090179852, filed Jan. 14, 2009 (now abandoned), which are incorporated herein in their entirety.

FIELD

Embodiments as described herein relate to three-dimensional ("3D") display systems, and more particularly, to ultra high-resolution volumetric 3D display systems.

BACKGROUND

Generally, a volumetric display refers to a graphical display device that forms a visual representation of an object in three physical dimensions, as opposed to the planar image of traditional screens that simulate depth through a number of different visual effects. Typically, volumetric displays create a 3D image via the emission, scattering, or relaying of illumination from regions in (x,y,z) space.

Conventional volumetric display architecture has upconversion particles suspended within a display volume and two projectors that project the light from two lasers onto the particles. A typical projector consists of a digital micro-mirror device ("DMD") array. Typically, the laser in the conventional system illuminates an entire DMD array, but only few columns of the array are enabled to form a 3D image. Conventional volumetric display architecture is very inefficient, because a lot of laser light is wasted.

Further, because a lot of laser power is unused, to increase the quality of a 3D image in the conventional volumetric display systems higher laser power needs to be used increasing the cost of the system.

Additionally, the conventional volumetric display systems are limited by a laser power. Increasing the laser power may damage the display volume with the particles. An example of a conventional volumetric display system is described in the article, authored by Hakki Refai, entitled "Static Volumetric Three-Dimensional Display", Journal of Display Technology, vol. 5, No. 10, October 2009, pages 391-397. FIG. 4 in that article shows the use of two digital light projection systems to create the volumetric image.

SUMMARY

Embodiments of apparatuses and methods to provide an ultra high-resolution volumetric three-dimensional (3D) display system are described. The ultra high-resolution volumetric three-dimensional (3D) display system comprises an image chamber, and an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis and the line illuminates a plane in the image chamber. An imaging system delivers the electromagnetic energy at a second wavelength to an area within the provided image slice. The line is moved along a third axis to form a three dimensional (3D) image.

In one embodiment, the ultra high-resolution volumetric three-dimensional (3D) display system comprises an image chamber, an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image. The line generator of the ultra high-resolution volumetric three-dimensional (3D) display system comprises a collimating optics to collimate the beam; a slicing optics configured to slice the collimated beam into a plurality of beamlets, a rotating optics configured to rotate the beamlets to form the line; a homogenization optics coupled to the rotating optics to homogenize the line; and a focusing optics to control the line.

In one embodiment, the ultra high-resolution volumetric three-dimensional (3D) display system comprises an image chamber, an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis and this line creates an illuminate plane in the image chamber. An imaging system delivers the electromagnetic energy at a second wavelength to an area within the provided image slice. The line (and hence the illuminated plane) is moved along a third axis to form a three dimensional (3D) image. The line generator of the ultra high-resolution volumetric three-dimensional (3D) display system comprises a collimating optics to form the beam; and a plurality of cylindrical lenses coupled to the collimating optics to convert the collimated beam into a line-shaped beam.

In one embodiment, the ultra high-resolution volumetric three-dimensional (3D) display system comprises an image chamber, and an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image. The beam is processed along the second axis independently from the first axis.

In one embodiment, the ultra high-resolution volumetric three-dimensional (3D) display system comprises an image chamber, and an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image. The width of the line controls the depth of each voxel in the display.

In one embodiment, the ultra high-resolution volumetric three-dimensional (3D) display system comprises an image chamber, and an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image. The width of the line controls the depth of each voxel in the display. The addressing system comprises a polygon scanner to move the line along the third axis.

In one embodiment, the ultra high-resolution volumetric three-dimensional (3D) display system comprises an image chamber, an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image. A control system is configured to synchronize the addressing system and the imaging system.

In one embodiment, the ultra high-resolution volumetric three-dimensional (3D) display system comprises an image chamber, an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image. The image chamber comprises a nanoparticle material.

In one embodiment, the ultra high-resolution volumetric three-dimensional (3D) display system comprises an image chamber, an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image. The image chamber comprises a microparticle material.

In one embodiment, the ultra high-resolution volumetric three-dimensional (3D) display system comprises an image chamber, an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image. The image chamber comprises a bulk crystal.

In one embodiment, the ultra high-resolution volumetric three-dimensional (3D) display system comprises an image chamber, an addressing system to direct a beam of electromagnetic energy at a first wavelength to slice through the image chamber. The beam of electromagnetic energy slices the image chamber along a first axis to provide an image slice. The addressing system comprises a line generator to shape the beam into a line extended along a second axis. An imaging system delivers the electromagnetic energy at a second wavelength to an area within the provided image slice. The line is moved along a third axis to form a three dimensional (3D) image. In an embodiment, the imaging system comprises a digital micromirror device, a grating light valve, a liquid crystal display, or any combination thereof. In an embodiment, the imaging system comprises at least three chip DLPs projecting at least three different wavelengths.

In one embodiment, a method to produce a three-dimensional image comprises directing a beam of electromagnetic energy at a first wavelength to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image.

In one embodiment, a beam of electromagnetic energy at a first wavelength is directed to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image. The beam is collimated. The collimated beam is sliced into a plurality of beamlets. The beamlets are rotated to form the line. The line is homogenized and controlled.

In one embodiment, a beam of electromagnetic energy at a first wavelength is directed to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image. The beam is collimated. The collimated beam is converted into a line-shaped beam.

In one embodiment, a beam of electromagnetic energy at a first wavelength is directed to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image. The beam is processed along the second axis independent from the first axis.

In one embodiment, a beam of electromagnetic energy at a first wavelength is directed to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image. The width of the line controls the depth of each voxel in the display.

In one embodiment, a beam of electromagnetic energy at a first wavelength is directed to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image. The line is moved along the third axis using a polygon scanner.

In one embodiment, a beam of electromagnetic energy at a first wavelength is directed to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image. The addressing system and the imaging system are synchronized.

In one embodiment, a beam of electromagnetic energy at a first wavelength is directed to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image. The image chamber comprises a nanoparticle material.

In one embodiment, a beam of electromagnetic energy at a first wavelength is directed to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image. The image chamber comprises a microparticle material.

In one embodiment, a beam of electromagnetic energy at a first wavelength is directed to slice through an image chamber along a first axis to provide an image slice. The beam is shaped into a line extended along a second axis. The electromagnetic energy at a second wavelength is delivered to an area within the provided image slice. The line is moved along a third axis to form a three dimensional (3D) image. The image chamber comprises a bulk crystal.

Other features and advantages of embodiments will be apparent from the accompanying drawings and from the detailed description that follows below.

BRIEF DESCRIPTION OF DRAWINGS

The embodiments as described herein are illustrated by way of example and not limitation in the figures of the accompanying drawings in which like references indicate similar elements.

DETAILED DESCRIPTION

The embodiments will be described with references to numerous details set forth below, and the accompanying drawings. The following description and drawings are illustrative of the embodiments and are not to be construed as limiting. Numerous specific details are described to provide a thorough understanding of the embodiments as described herein. However, in certain instances, well known or conventional details are not described in order to not unnecessarily obscure the embodiments in detail.

Reference throughout the specification to "at least some embodiments", "another embodiment", or "an embodiment" means that a particular feature, structure, or characteristic described in connection with the embodiment is included in at least some embodiments as described herein. Thus, the appearance of the phrases "in at least some embodiments" or "in an embodiment" in various places throughout the specification are not necessarily all referring to the same embodiment. Furthermore, the particular features, structures, or characteristics may be combined in any suitable manner in one or more embodiments.

Overview

Embodiments of apparatuses and methods to provide a static-volume, three-dimensional display that is capable of producing both static and moving images with high resolution, high brightness, and different dimensions and the systems that comprise the display are described herein.

Figure 1A:
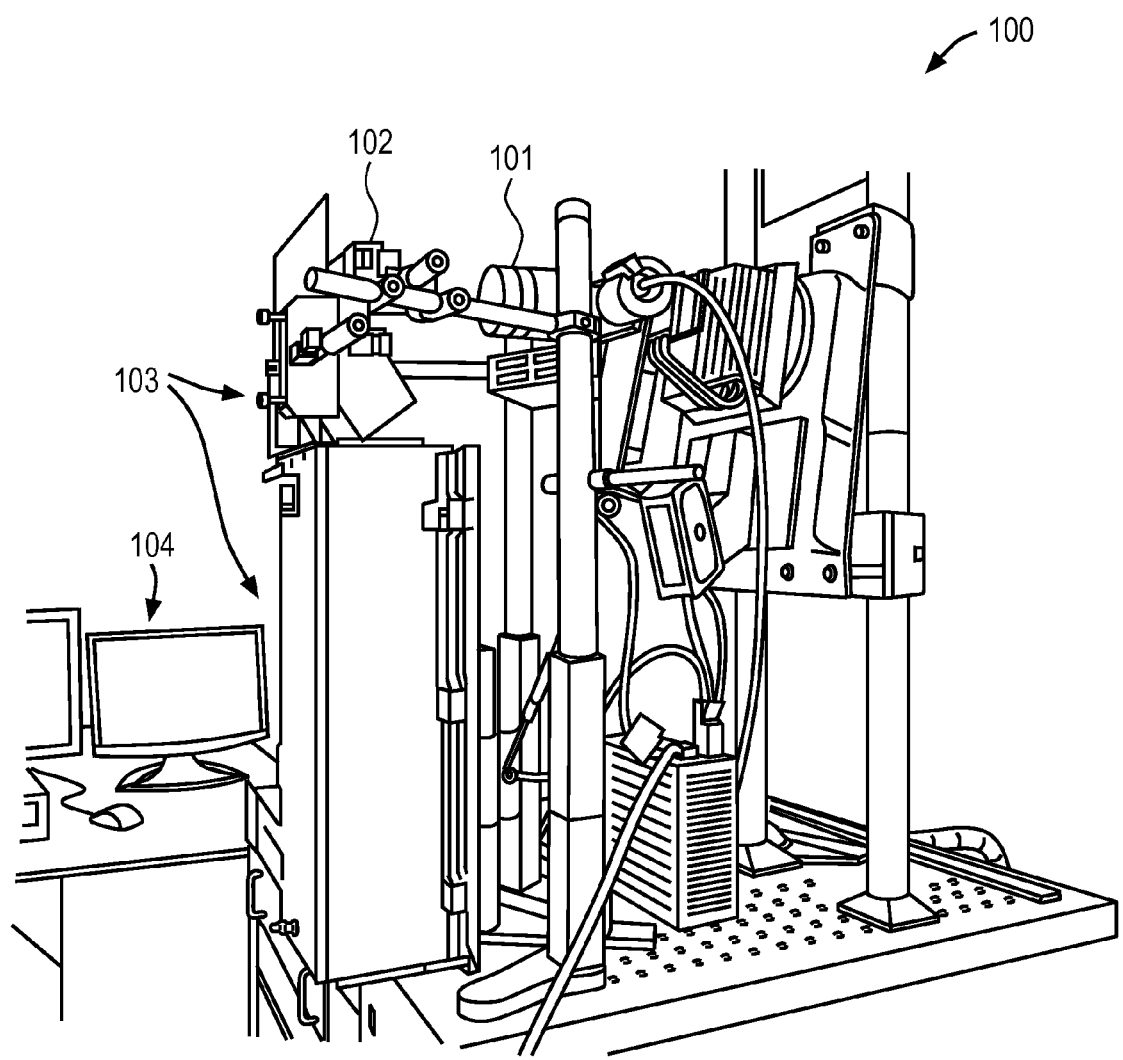
FIG. 1A shows an exemplary embodiment of overall configuration of an ultra high-resolution volumetric 3D display system.

FIG. 1A shows an exemplary embodiment of overall configuration of an ultra high-resolution volumetric 3D display system. In one embodiment, main components of the display include an imaging system 101, an image chamber 102, an addressing system 103, and a control system 104.

Figure 1B:
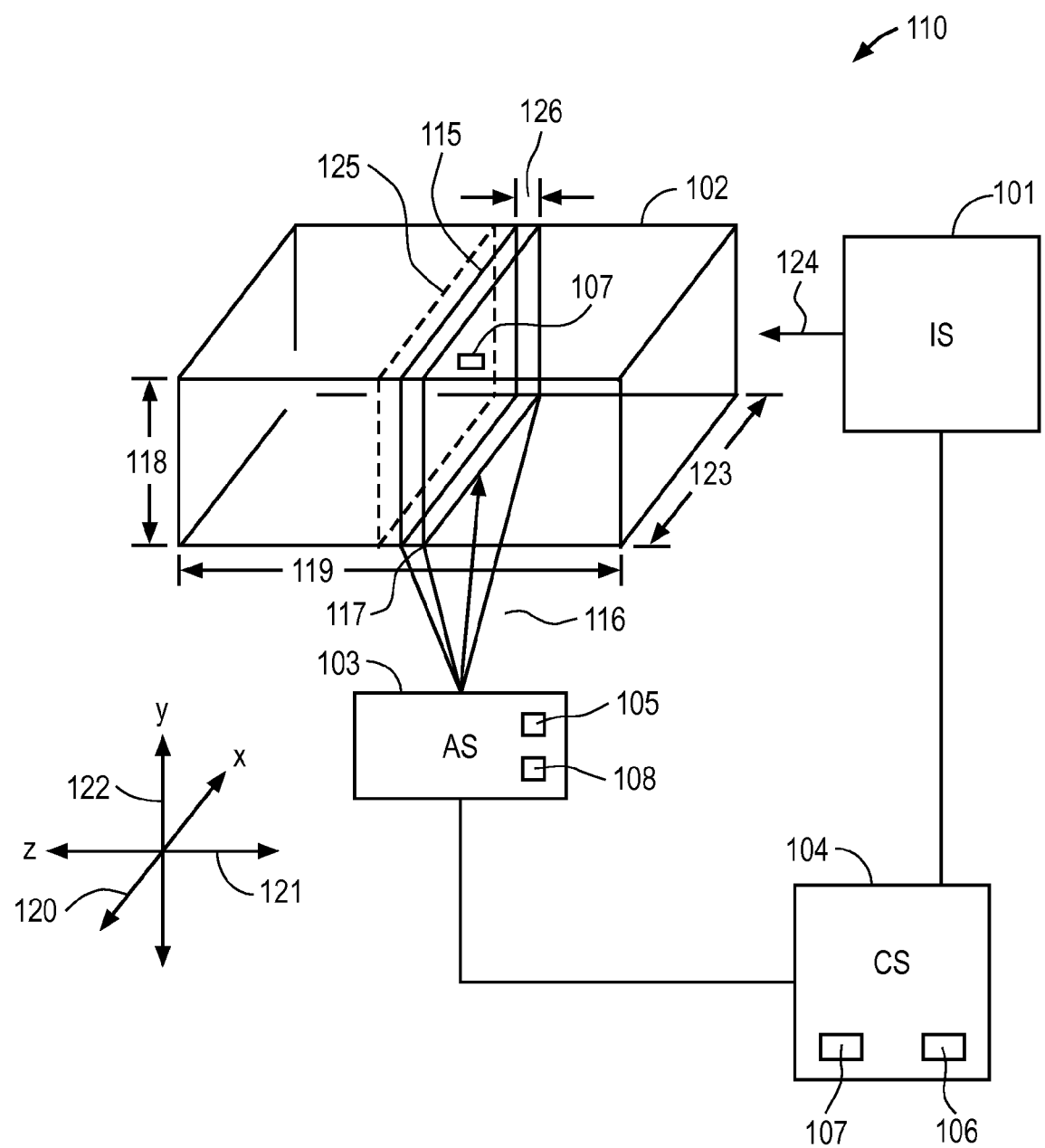
FIG. 1B shows a block diagram of an exemplary embodiment of an ultra high-resolution volumetric 3D display system.

FIG. 1B shows a block diagram of an exemplary embodiment of an ultra high-resolution volumetric 3D display system 110. The ultra high-resolution volumetric 3D display system comprises image chamber 102, and addressing system 103 to direct a beam 116 of electromagnetic energy at a first wavelength to slice through the image chamber 102. In an embodiment, the beam 116 slices the image chamber 102 along an axis Y 122 to provide an image slice 115. In an embodiment, the addressing system 103 includes a line generator 105 to shape the beam 116 into a line 117 extended along an axis X 120. Imaging system 101 delivers an electromagnetic energy 124 at a second wavelength that is different from the first wavelength to an area within the image slice 115. The beam 116 shaped into line 117 is moved along an axis Z 121 to form a three dimensional (3D) image (not shown).

The imaging system 101, addressing system 103, and control system 104 work together to produce three-dimensional images in the following manner. First, an image that is to be displayed is imported into a software subsystem 106 of the control system 104. The original image may be constructed in any one of several commercially available computer aided design (CAD) software packages or may consist of a set of voxel values in a three dimensional coordinate system generated by an imaging device (such as an MRI, CAT, or similar) or by a scientific computation that models some three-dimensional system. In an embodiment, the software subsystem 106 converts the original image into a new format for use by the other systems of the display. The new format is obtained by slicing the image along the vertical plane, so that the image now comprises effectively of a stack of thin pieces of paper, each with one section of the image printed on it. Within each slice of the image, the details of the image are divided into a grid of squares. Each square is one pixel of the image to be displayed in that slice, and the number of pixels within a slice depends on the details of the construction of the imaging system.

Once the image is converted into a number of slices with a set of pixels on each slice, the software subsystem 106 then drives hardware parts 107 of the control system 104 to begin image generation. The software subsystem 106 delivers the location of the first slice to the addressing system 103 and the information on the pixels in that slice to the imaging system 101. The software subsystem 106 also sends signals to the imaging system 101 and addressing system 103, called trigger signals, which coordinate the operation of the imaging and addressing systems so that a slice and its corresponding pixel information are delivered to the image chamber 102 at the same exact time.

In an embodiment, addressing system 103 directs the optical power from an infrared laser into a beam (e.g., beam 116) with the shape of a long and narrow rectangle ("line"), such that the beam slices vertically (e.g., along axis Y 122) through the image chamber 102. In an embodiment, the imaging system 101 delivers optical power from a second infrared laser to small square areas (e.g., an area 107) within the vertical slice 115. Each square area corresponds to one of the pixels in that particular slice of the image. The imaging system 101 controls which pixels receive optical power from the laser and which pixels do not. In an embodiment, when a square area (pixel) within the slice (area plus slice width is called a volume pixel or voxel) receives optical power from both the addressing system 103 and the imaging system 101, an optical process called two frequency two step ("TFTS") upconversion occurs within the material(s) that make up the image chamber 102 and converts the infrared optical power into optical power in the visible spectrum, and the voxel can now be seen by a human viewer.

The imaging system 101 is so designed that all of the voxels that are needed to construct that slice of the overall image generate visible light simultaneously. Depending on the materials used in the image chamber, the visible light may be all of one color or may consist of multiple colors that the viewer will observe as composite color. The control system 104 then directs the addressing system 103 to move the linear beam to a next position to illuminate the next slice of the image (e.g., a slice 125), and directs the imaging system 101 to deliver optical power to the appropriate voxels within the new slice (e.g., slice 125).

The control system 104 directs the imaging and addressing systems to step sequentially through all of the slices of the image produced by the software subsystem. If the systems step through the slices quickly enough, the observer effectively sees all of the slices simultaneously and therefore will see a three-dimensional image within the image chamber 102. For continual viewing the entire image generation process described is repeated through the entire image chamber 102 at a high enough rate that the human viewer does not perceive any variations in the intensity of the image (called flicker).

In an embodiment, to display a moving image, the original moving scene is divided into a series of still images, as is standard in all movies, and the series of still images are displayed sequentially in the image space. Each of the individual still images is generated in the same manner as a single static image. In what follows, the details of each of the systems and subsystems are presented.

Image Chamber

In an embodiment, the image chamber (e.g., image chamber 102) is constructed from one or more materials that are capable of supporting the TFTS upconversion process central to the production of visible-light images and the infrastructure that supports and confines the materials. Moreover, in one embodiment, the image chamber 102 is constructed from a substantially clear, transparent material that includes upconverting materials such as upconverting phosphors. The materials used may be either in some form of solid or in liquid form. The infrastructure used to construct the chamber is chosen according to the physical properties of the materials, including but not limited to the material's weight, density, and rigidity, and whether the material is a solid or a liquid. The important aspects of the image chamber are described herein.

Figure 2:
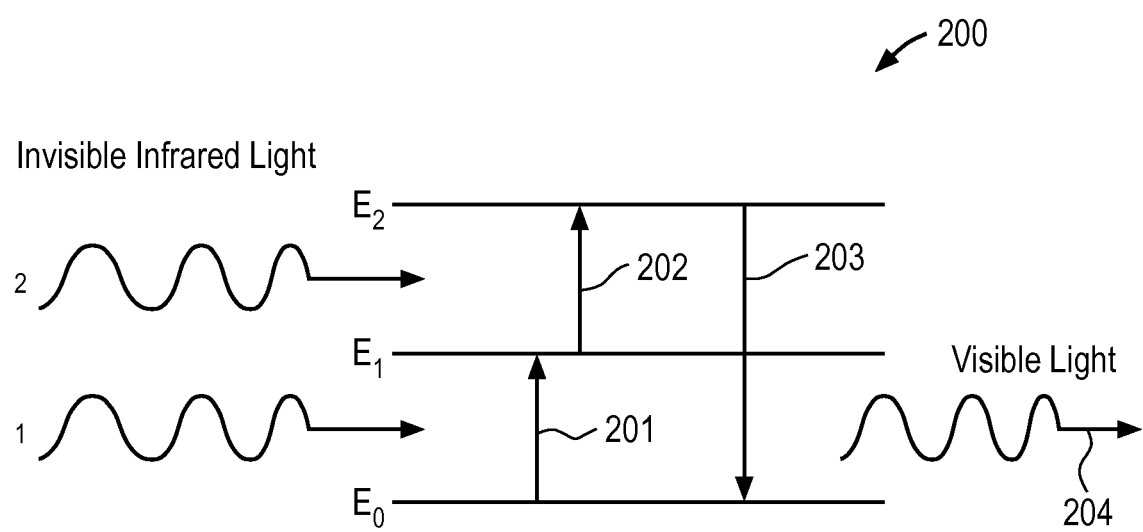
FIG. 2 shows a diagram of an exemplary embodiment of a two frequency two step process.

FIG. 2 shows a diagram 200 of an exemplary embodiment of a two frequency two step process. In an embodiment, the materials used for the image chamber support the TFTS upconversion process. In an embodiment, optical power from the addressing laser at wavelength $\lambda_1$ provides the energy needed to excite electrons in the material from their ground state $E_0$ to a higher intermediate energy state $E_1$ (a transition 201). If optical power from the imaging laser at wavelength $\lambda_2$ enters the material at the same time that the optical power from the addressing laser is present, or if the optical power from the imaging laser arrives before the excited atoms return to the ground state on their own, then the electrons that have been excited into $E_1$ absorb energy from the imaging laser and are further excited from $E_1$ up to energy state $E_2$ (a transition 202).

In an embodiment, for all of the upconversion materials considered for the image chamber, the wavelengths $\lambda_1$ and $\lambda_2$ correspond to infrared radiation. Once the electrons have absorbed sufficient energy to reach energy state $E_2$, the electrons have the opportunity to release the extra energy and return to the ground state (a transition 203). In an embodiment, the transition directly back to the ground state is preferred over other possible methods because of the physical structure of the material. In an embodiment, the amount of energy released by the electron, given by $E_2-E_0$, corresponds to the energy of an optical wave 204 in the visible spectrum, and the light so generated is visible to the observer. The wavelength of the visible light, and therefore the color perceived by the observer, is determined by the value of $E_2-E_0$ and can be controlled by the composition of the material used within the image chamber. The efficiency of the conversion process, determined by the energy contained in the visible light output divided by the energy contained in the two infrared light inputs, is also a function of the material composition and structure.

There are several possible materials for use in the image chamber, all of which support the TFTS upconversion process. Each of these materials is described below.

Nanoparticle-Based Materials

The first possible material is comprised of nanoparticles dispersed in a host material. Nanoparticles are structures that have dimensions on the order of tens of nanometers. Nanoparticles may comprise semiconductor structures, miniature crystals that may or may not contain dopant atoms, or similar material systems. In an embodiment, for the display, the nanoparticles are constructed of materials that support TFTS. The nanoparticles may or may not be encapsulated in a coating layer. If the coating layer is present, it may contain active materials that contribute to the intended function of the nanoparticle or it may contain only passive materials that do not directly contribute to the nanoparticle's function. Once constructed, the nanoparticles are dispersed in a host material by one of several common processes. The host material may be a liquid or a solid, and can include polymers, epoxies, and similar materials that are initially viscous and then subsequently solidify. This composite material is used to fill the image chamber and produce a visible image via TFTS.

There are several important parameters of the nanoparticle-based material that affect the efficiency of the upconversion process and the resolution of the image that can be generated. In an embodiment, it is desirable to have the refractive index of the host material to be as closely equal to the refractive index of the nanoparticle. This condition on the refractive index is commonly referred to as index matching. When index matching occurs, any light, whether that coming from the addressing and imaging lasers or that generated by the nanoparticle by upconversion, is not redirected by refraction at the surface where the nanoparticle meets the host material.

When index matching does not occur, refraction of the light is possible and thus the light travels in a new direction, different than the direction that was intended or designed. Therefore, good index matching between the host and nanoparticles allows energy from the addressing and imaging lasers to travel to the intended slices and voxels, respectively, without being diverted or redirected as they pass through the image chamber. As a result, the size of each voxel and the amount of energy the voxel has available to generate visible light can be controlled much more easily which facilitates the generation of millions of small, well-defined voxels to produce a high quality image by the display.

In an embodiment, the size of the nanoparticle is important for determining the presence and magnitude of diffractive processes. Diffraction occurs when light is incident on a boundary between two materials, such as the boundary between the host material and the surface of the nanoparticle. The effect of diffraction is to redirect a portion of the optical power traveling through the material into new directions that are different than the intended direction. The net effect on the operation of the display is therefore similar to the effect occurring for poor index matching. The diffraction process is minimized if the wavelengths of the light waves in the material are much larger than the dimensions of the nanoparticle. However, the upconversion of a nanoparticle decreases to some extent as the dimensions of the nanoparticle decrease.

In an embodiment, the existence or lack of a coating layer to encapsulate the primary upconversion material can impact the upconversion efficiency of the nanoparticle and the integrity of the visible color generated within the image. Because the nanoparticles are so small, the surface area becomes a larger percentage of the nanoparticle compared to the volume contained by the surface. If left uncoated or if poorly made, the surface acts as a site where electrons can either release their energy without generating visible light or transfer their energy to another nanoparticle instead of generating visible light.

In the first instance, no visible optical output is generated by a larger percentage of the energized electrons, and the brightness of the image is diminished. In the second instance, the energy transferred to the other nanoparticle can be used to generate visible light, but this light may be generated at a different wavelength than intended (red instead of green for example) or may be generated from a position outside of the originally intended volume space of the voxel. Depending on the design of the nanoparticle, a coating placed over the nanoparticle would reduce the number of energized electrons that did not produce visible light and thus provide a higher upconversion efficiency.

In an embodiment, the choice and density of the dopant within the nanoparticle affects the output wavelength and the upconversion efficiency. Different dopants produce different values of $E_2-E_0$, and thus different colors for the visible light generated by TFTS. If nanoparticles with different dopants are simultaneously present in the image chamber then the possibility exists to produce multiple colors within the material and thus produce a multi-colored image rather than a monochromatic (single color) image. The concentration of dopants within the nanoparticle determines the number of electrons that are available for excitation and subsequent light emission within each voxel of the image. The maximum concentration of dopants is limited by the ability of the base material to accept dopant atoms, the doping process used, and the need to maintain the structural and physical integrity of the base material.

In an embodiment, the density of nanoparticles within the host material affects the number of nanoparticles per voxel volume that are available to contribute light to the voxel when activated. In general, the more nanoparticles located within the voxel volume, the brighter the voxel appears to the observer when activated by TFTS. The density of nanoparticles within the host is limited by the dispersing process used and the need to maintain the structural and physical integrity of the host material.

In an embodiment, the host material naturally possess high optical clarity and minimal absorption at all of the wavelengths used in the display prior to dispersion of the nanoparticles within the material. It is desirable to minimize the absorption so that the maximum amount of addressing and imaging laser power is available to each nanoparticle and voxel, and so that the generated visible light is not reduced in intensity as it passes through the image chamber to the observer. A material with high optical clarity does not scatter the light passing through it into random directions, and thus the contrast of the image can be made quite large and the voxels can be more precisely defined due to the same effects discussed with respect to diffraction and refractive index matching.

Microparticle-Based Materials

In an embodiment, the image chamber comprises microparticles dispersed in a host material. Microparticles are structures that have dimensions on the order of micrometers or tens of micrometers. Similarly to nanoparticles, microparticles may consist of semiconductor structures, miniature crystals that may or may not contain dopant atoms, or similar material systems. Microparticles can be obtained by controlled growth and manufacturing processes or by the grinding of bulk crystals of the material into micrometer size pieces. In an embodiment, for the display, the microparticles are constructed of materials that support TFTS. Microparticles are generally not encapsulated in a coating as the surface area is much smaller in proportion to the volume of the particle, and surface effects are of less concern.

Once constructed, the microparticles are dispersed in a host material by one of several common processes. The host material may be a liquid or a solid, and can include polymers, epoxies, and similar materials that are initially viscous and then subsequently solidify. This composite material is used to fill the image chamber and produce a visible image via TFTS.

Many of the important parameters for the microparticle-based materials are similar to those of the nanoparticle-based materials. Index matching, particle size, dopant choice and density, and host material properties are again concerns for the same reasons noted for the nanoparticle-based materials and will not be repeated here. An additional concern for microparticles is the uniformity of the particles in terms of volume and shape. For the method where microparticles are constructed by crushing and grinding of a bulk material, the uniformity of shape and size is typically very poor, and thus the upconversion efficiency, refractive index scattering and the optical clarity of the composite material vary significantly throughout the material volume. This results in the creation of images with non-uniform intensity and contrast, which is undesirable.

Microparticles formed by controlled growth have far less variability, but any variability will be more notable, since there will generally be a smaller number of particles present in the voxel volume and variability in the microparticle properties will be less likely to average out across the fewer particles. The larger particles are now on the same dimension of all of the optical wavelengths used in the display, so index matching is more critical to avoid the diffraction effects that deteriorate the image quality.

Bulk Crystals

In an embodiment, the image chamber comprises is a bulk crystal. Once a material system is identified that supports TFTS and possesses potentially high upconversion efficiency, the material is constructed as a solid crystal that is ideally homogeneous in its underlying crystalline structure. Typically the crystal consists of a host crystal doped with rare-earth ions. The bulk crystal can be grown using any number of commercially viable methods. In an embodiment, a single uniform crystal is grown to the exact dimensions of the targeted image chamber. In an embodiment, because the maximum dimensions attainable for a single uniform crystal are limited by the growth methods and equipment used, a single crystal image chamber is possible only for image chambers with dimensions on the order of a few centimeters per side.

Figure 3:
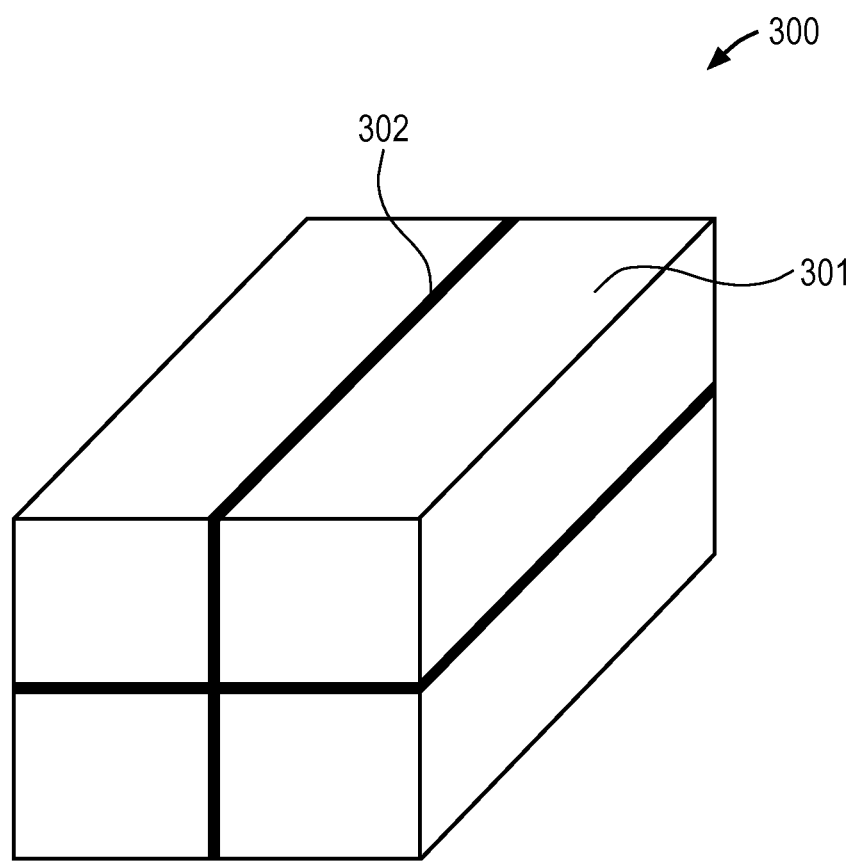
FIG. 3 is a perspective view showing an exemplary embodiment of multiple bulk crystals cemented together to create a large image chamber.

FIG. 3 is a perspective view 300 showing an exemplary embodiment of multiple bulk crystals cemented together to create a large image chamber. As shown in FIG. 3, several crystals, such as a crystal 301 are cemented together using an optical cement 302. Disruption of the image at the boundaries between the crystals may be a concern in this configuration. In general, the cost of a bulk crystal is significantly higher than that of the other materials for the same volume. The TFTS process in bulk crystals can also be dependent on the polarization of the lasers used in the display, which requires additional optical components to control polarization.

Glasses

In an embodiment, the image chamber is a glass material doped with rare earth ions that support the TFTS process. The glass material can be assembled or grown using any of several commercially viable methods. Glasses have the advantage of being amorphous materials that can be grown and shaped into image chambers of different dimensions and volumes and do not require precise crystalline assembly. The dimensions and volumes attainable for glasses is limited primarily by the equipment used to produce the glasses. Current processes for doping the glasses and physical constraints limit the maximum doping concentration that can be achieved. The limit on the number of dopant ions per unit volume limits the total output of optical energy from TFTS upconversion that can be achieved in each voxel of the three-dimensional image.

Imaging System

In an embodiment, the objective of the imaging system is to direct optical energy from the imaging laser to the voxels in each slice of the image that contribute to the overall image to be displayed. In an embodiment, the imaging system has the ability to select which voxels will receive optical energy from the imaging laser and the ability to control the dimensions of the beam of light at the voxel location to achieve the desired voxel height and width. In an embodiment, an array of optical or mechanical switches placed in the path of the imaging laser is used to select the voxels to be illuminated. The dimensions of the output beam from the switches at the site of the voxel is conditioned using a lens system.

Several types of switch arrays can be used to perform the function of selecting which voxels will be illuminated.

Figure 4:
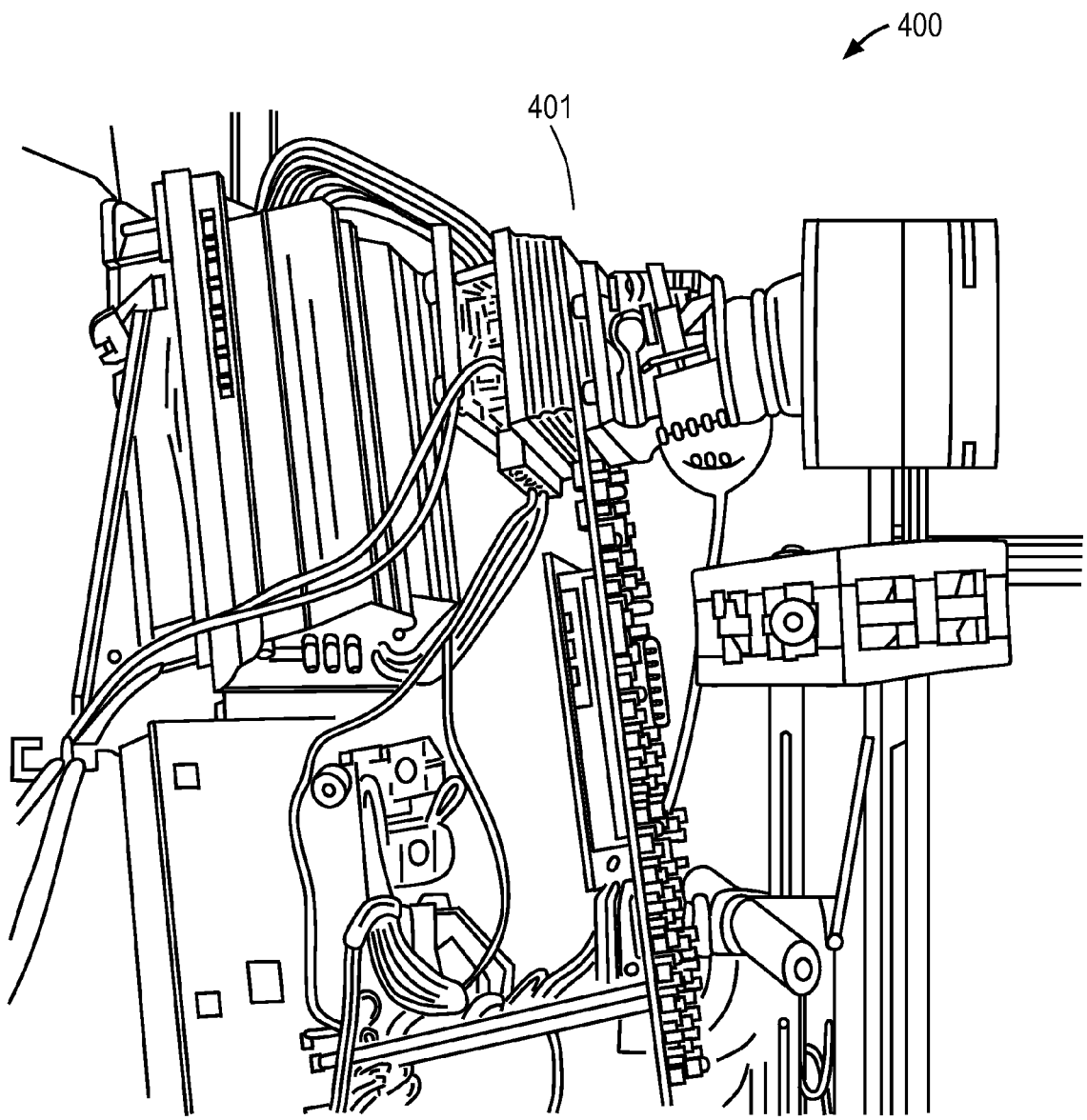
FIG. 4 is a view showing an exemplary embodiment of a digital light processing ("DLP") imaging system.

FIG. 4 is a view 400 showing an exemplary embodiment of a digital light processing ("DLP") imaging system 401. The DLP imaging system 401 comprises a switch array that is a digital micromirror device ("DMD"), as shown in FIG. 4. The DMD device is typically built on a silicon wafer and comprises an array of small mirrors that are suspended above an air gap. The mirrors are suspended from flexible silicon frames that are free to flex when a voltage is applied to electrical connections attached to the frame. In a common construction of the DMD, the mirror is in one orientation when no voltage is applied, and the mirror rotates to a new position when a voltage is applied. Light energy incident on the mirror is therefore directed to one output direction for no applied voltage and a different output direction when a voltage is applied. In an embodiment, DMD imaging system 401 represents one of the imaging system 101, 501, 601 as depicted in FIGS. 1A, 1B, 5, and 6.

A voxel is selected or not selected by applying the correct voltage level to the mirror that corresponds to the voxel location within the image slice. Light is then either directed toward the output lens and the image chamber (voxel is illuminated) or directed away from the image chamber (voxel is not illuminated). The DMD is commonly mounted on a printed circuit board that contains the circuitry, power supplies, microprocessors and other electronic systems for correctly driving the DMD. This electronics board is commonly referred to as a digital light processing (DLP) board.

In an embodiment, the imaging system comprises a switch array that is a grating light valve ("GLV"). The GLV device is typically built on a silicon wafer. In an embodiment, each switch in the switch array consists of parallel rows of highly reflective micro-ribbons suspended above an air gap. The ribbons are a few microns ("µm") in length and width and have a top layer of aluminum to make them reflective. The ribbons are configured to alternate between static ribbons which do not move and active ribbons that can be moved when a voltage is applied. Individual electrical connections to each active ribbon electrode provide for independent movement. The ribbons and the substrate are electrically conductive. When the voltage of the active ribbons is set to ground potential, all ribbons are undeflected, and the switch acts as a standard mirror and directs light to one output direction. When a voltage is applied between the ribbon and base conductor the active ribbon deflects downward toward the substrate. This deflection creates diffraction effects on incident light causing the light to be reflected at a different angle than that of the undeflected ribbons. The wavelength to diffract is determined by the spatial frequency of the ribbons. As this spatial frequency is determined by the photolithographic mask used to form the GLV device in the Complementary Metal-Oxide Semiconductor ("CMOS") fabrication process, the output angles can be very accurately controlled. The GLV can be switched on the order of tens of nanoseconds, which is faster than that achievable with DMD technology.

In an embodiment, the imaging system comprises a switch array that is a liquid crystal display ("LCD"). The LCD typically comprises cells of liquid crystalline materials sandwiched between conductive plates. Polarizers are placed on the outside of both plates. The size of the cells is controlled by process used to create the liquid crystal layer and to pattern the electrodes on the plates. Several different types of liquid crystalline materials can be used, all of which have the property that the orientation of the molecules within the material can be controlled by a voltage placed across the conductive plates.

The polarization of the light traveling through each cell is affected by the orientation of the liquid crystal molecules and the polarizer on the input plate. In the most common configuration, when no voltage is applied the polarization of the light exiting the liquid crystal is such that all of the optical power is blocked by the polarizer on the output plate. When the correct voltage is applied across the plates, the polarization of the light exiting the liquid crystal is such that all of the optical power is passed by the output polarizer and thus this power can continue on to the lens system and illuminate the selected voxel.

The LCD typically switches slower than the DMD and much slower than the GLV, and thus limits the speed at which successive slices of the three-dimensional image can be addressed. The LCD is the most limiting of the switch arrays on the number of times the three-dimensional image can be created per unit time, and therefore the image size will be most constrained. An advantage of the LCD approach is the ability to control the output optical power in an analog manner rather than the simple on-off function of the GLV and DMD. This provides the ability to control the intensity of the voxel emission at the switch array location rather than using an additional control device.

In an embodiment, the number of switch arrays used in the display directly correlates with the number of visible wavelengths (or colors) to be used in the creation of the image.

Figure 5:
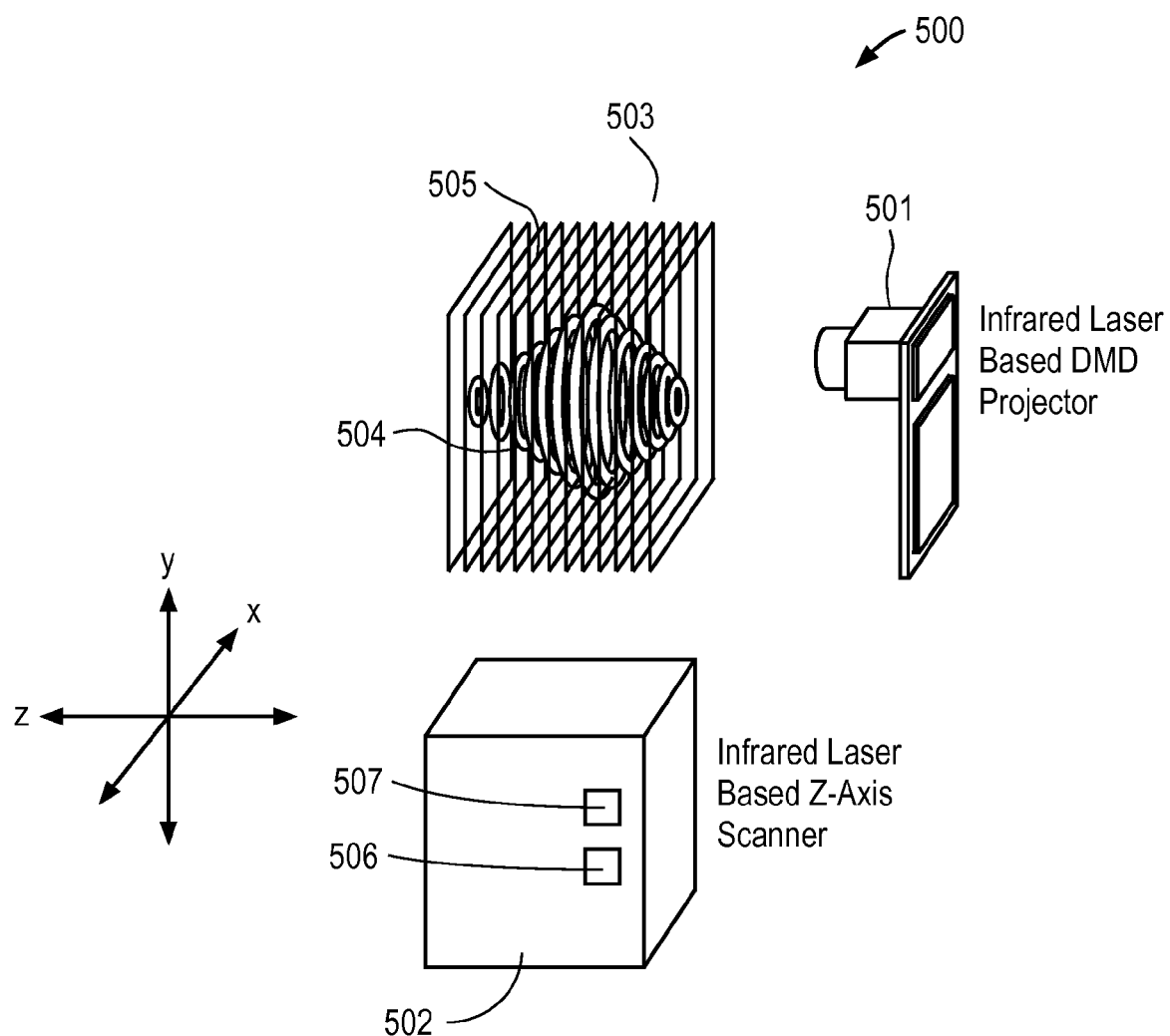
FIG. 5 is a block diagram of an exemplary embodiment of a monochromatic ultra high-resolution volumetric 3D display system.

FIG. 5 is a block diagram of an exemplary embodiment of a monochromatic ultra high-resolution volumetric 3D display system. As shown in FIG. 5, system 500 comprises an imaging system 501, an image chamber 503, and an addressing system 502. Addressing system comprises a line generator 506 and a beam scanning system 507. In an embodiment, imaging system 501 is a one chip DLP system. In an embodiment, imaging system 501 comprises an infrared laser base DMD projector. In other embodiments, imaging system 501 comprises a light emitting diode, or other electromagnetic energy sources.

For a monochromatic image 503 that contains only one color, a single switch array is used in combination with a single imaging lens, as shown in FIG. 5. Addressing system 502 directs a beam of electromagnetic energy at a predetermined wavelength to slice through the image chamber 503 along an axis Y to provide an image slice, e.g., an image slice 505. In an embodiment, the addressing system 502 includes a line generator (not depicted) to shape the beam into a line extended along an axis X. Imaging system 501 delivers an electromagnetic energy at a predetermined wavelength to an area within the image slice (e.g., image slice 505) to produce a slice of a 3D image 504. In an embodiment, the wavelength delivered by the imaging system is different from the wavelength delivered by the addressing system. In an embodiment, the beam directed by the addressing system 502 and shaped into a line by the line generator is moved along an axis Z to form three dimensional (3D) image 504.

In an embodiment, for a three-color image, typically composed of red, green, and blue ("RGB") wavelengths, three switch arrays are used, one for each wavelength to be generated. In an embodiment, each of the switch arrays is illuminated by a separate infrared imaging laser, and the wavelengths of these imaging lasers are in general not the same. In an embodiment, the light outputted from the three switch arrays is combined such that the switch at the same location in each array is responsible for directing optical power to the same voxel in the image slice within the image chamber. An exemplary method for combining the outputs is shown in FIG. 6.

Figure 6:
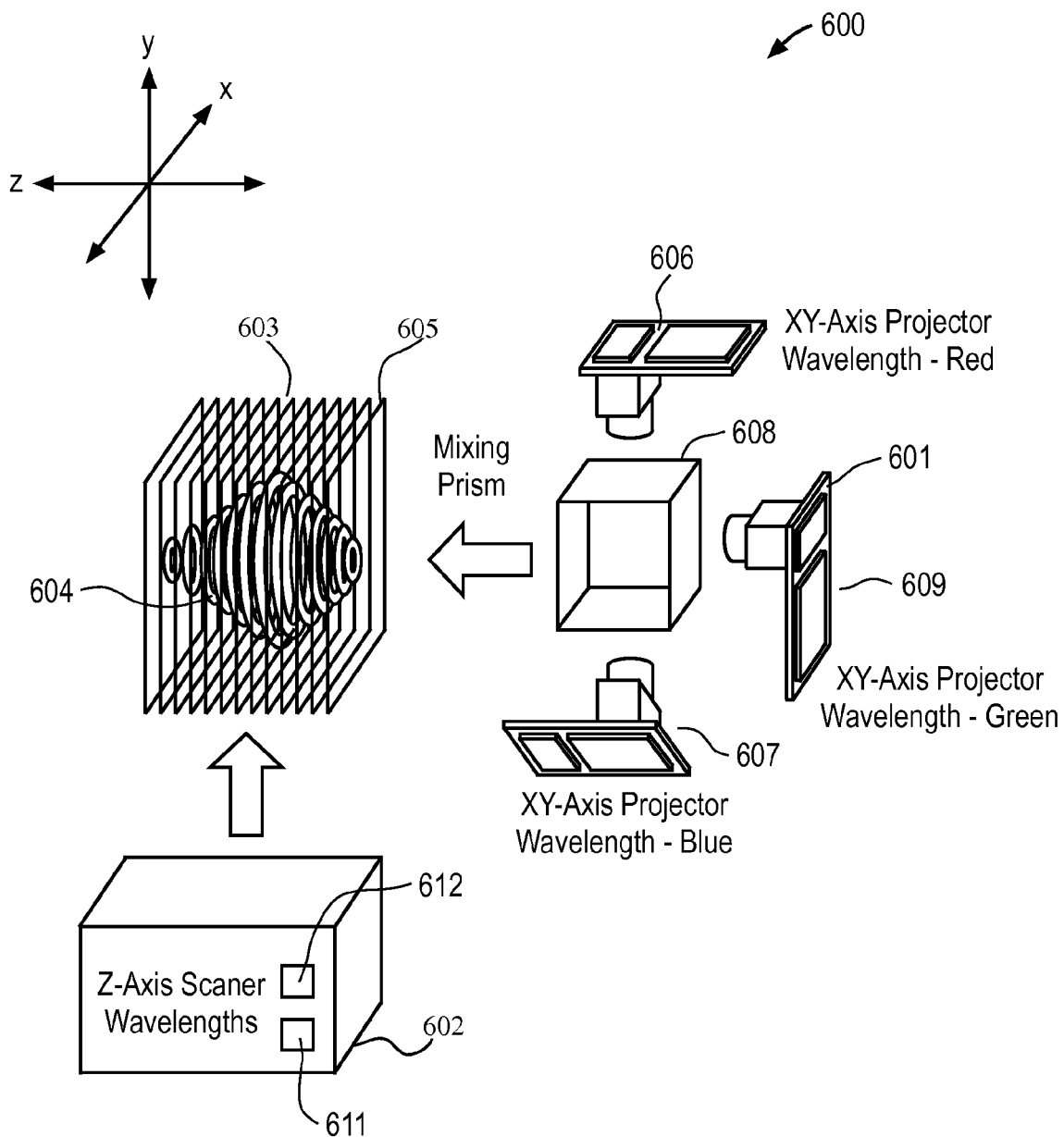
FIG. 6 is a block diagram of an exemplary embodiment of a color ultra high-resolution volumetric 3D display system.

FIG. 6 is a block diagram of an exemplary embodiment of a color ultra high-resolution volumetric 3D display system 600. As shown in FIG. 6, system 600 comprises an imaging system 601, an image chamber 603, and an addressing system 602. Addressing system comprises a line generator 611 and a beam scanning system 612. In an embodiment, imaging system 601 is a three-chip DLP imaging system. Imaging system 601 comprises DLP projectors 606, 607, and 609 and an optical combiner 608.

Addressing system 602 directs a beam of electromagnetic energy at a predetermined one wavelength or several wavelengths combined to slice through the image chamber 603 along an axis Y to provide an image slice, e.g., an image slice 605. In an embodiment, the addressing system 602 includes a line generator (not depicted) to shape the beam into a line extended along an axis X. Imaging system 601 delivers an electromagnetic energy at three wavelengths from combiner 608 to an area within the image slice (e.g., image slice 605) to produce a slice of a 3D image 604. These three wavelength are different from the wavelength provided by addressing system 602. In an embodiment, the beam directed by the addressing system 602 and shaped into a line by the line generator is moved along an axis Z to form 3D image 604.

In an embodiment, the output light from the three DLP projector switches passes through optical combiners, and the arrays are aligned so that outputs from the same switch location in each array overlap at the combiner 608. In this embodiment, only a single lens system is needed to direct the light from the three arrays to the image slice. In other embodiments, other methods using a lens system for each array output are possible.

In an embodiment, the lens system performs two functions. First, the lens system transforms the spacing of the switches in the switch array into the spacing of the voxels required in the image slice. Second, the lens system ensures that all the light from a given switch in the array is imaged to the targeted area of the voxel in the image slice. In an embodiment, a minimum of two lenses is required for the system to perform these functions.

In a high performance system, additional lenses are added to compensate for aberrations and distortions caused by the two primary lenses. This compensation is designed so that the size of each voxel is constant across the entire image slice, and that the imaging plane of the lens system is as flat as possible so that all voxels are generated at the same depth within the image chamber. For a system used with a three-color display, the additional lenses will also provide compensation for chromatic aberrations so that the lens system has nearly equal performance at each of the three wavelengths of the imaging laser sources.

Addressing System

In an embodiment, an objective of the addressing system (e.g., addressing system 103 depicted in FIG. 1B) is to direct optical energy from the addressing laser along a vertical plane (or slice) through the image chamber (e.g., along Y axis 122 through image chamber 102) and to sweep this plane of light along the depth dimension of the image chamber to provide the canvas on which each slice of the image is written by the imaging system. That is, the addressing system provides a virtual screen or canvas on which a slice of a 3D image is written. The addressing system moves the virtual screen along the depth dimension of the image chamber (e.g., along Z axis 121). A corresponding slice of the 3D image is written by the imaging system on the virtual screen at a Z position. Therefore, the addressing system is able to form an optical beam (e.g., beam 116) that has the same width as the width of the image space (e.g., a width 123) and a very narrow depth (e.g., corresponding to a thickness 126), so that only a very thin slice along a plane of the image chamber 102 (e.g., slice 115) is illuminated. That is, the cross-section of the optical beam 116 is extended along X axis 120 into a line having a length corresponding to the width 123 and a thickness corresponding to thickness 126, so that slice 115 is illuminated without sweeping the beam 116 along X axis 120. In an embodiment, the beam delivered by the addressing system is controlled so that the depth of the beam is no larger than the targeted depth of a voxel over the entire height (e.g., height 118) of the image chamber. Further, the addressing system is able to sweep this optical beam over ideally the entire depth dimension (e.g., a dimension 119) of the image chamber without disrupting the beam shape or propagation direction. In an embodiment, the beam shaping is performed by an optical line generating system (e.g., line generating system 105) and sweeping of the optical beam is achieved using a beam scanning system 108.

Figure 7A:
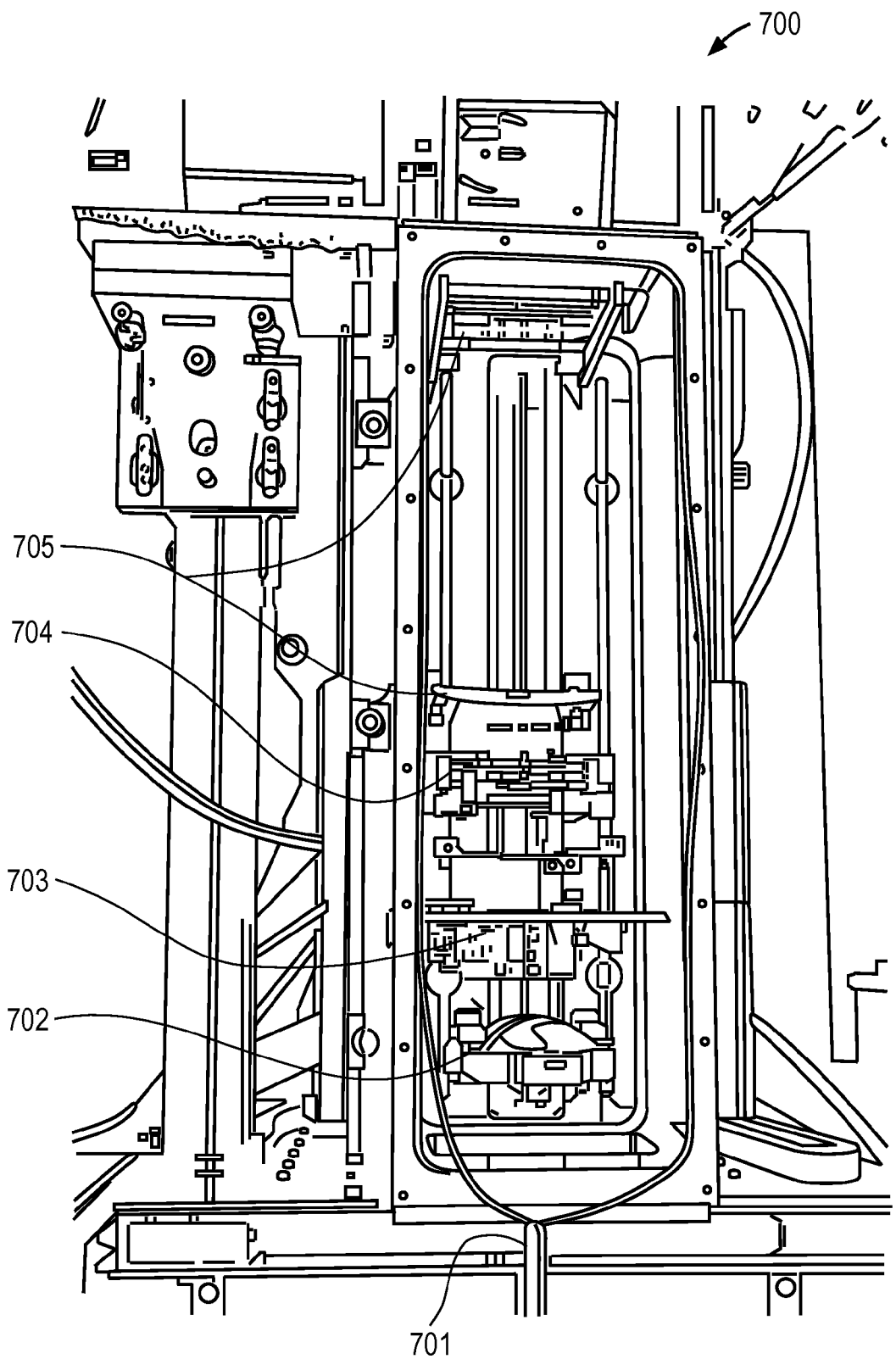
FIG. 7A shows an exemplary embodiment of a line generator for use in the ultra high-resolution volumetric 3D display.
Figure 7B:
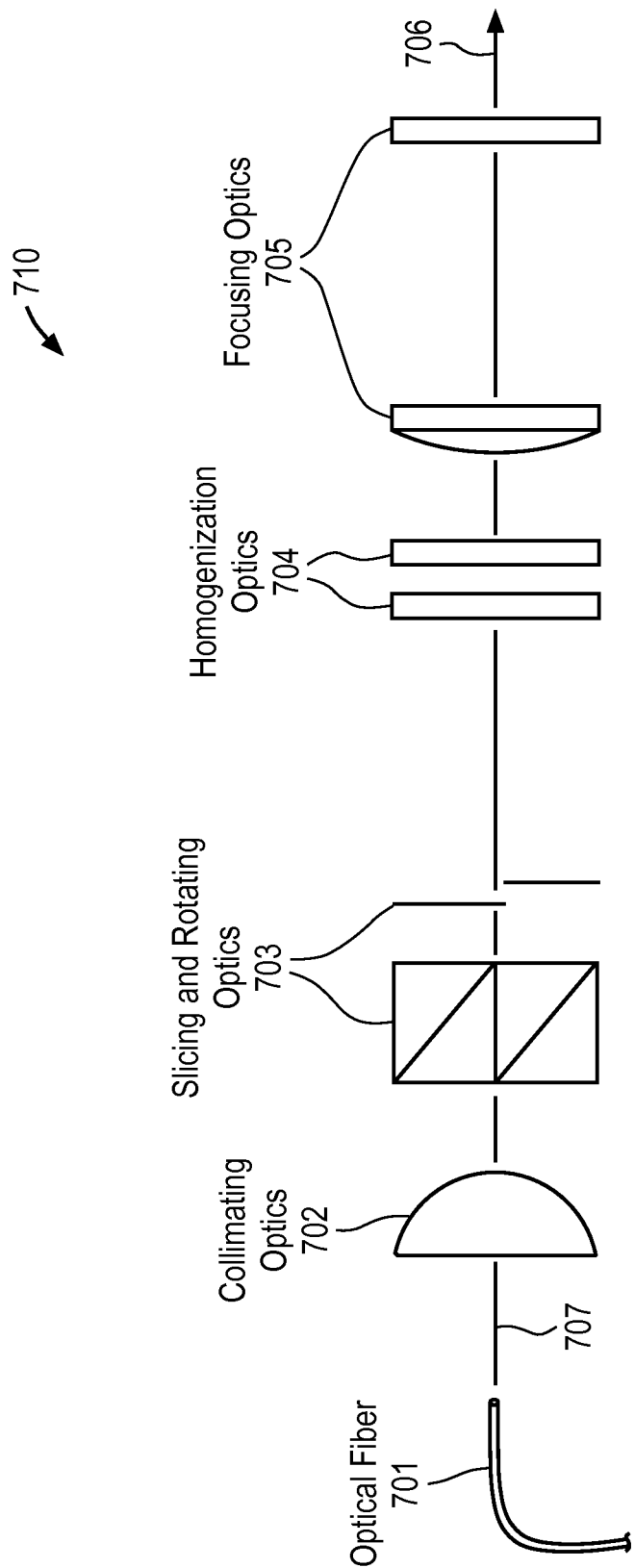
FIG. 7B shows an arrangement of optical components which can be an embodiment of a line generator.

FIG. 7A shows an exemplary embodiment of a line generator 700 for use in the ultra high-resolution volumetric 3D display. FIG. 7B shows a diagram 710 of the exemplary embodiment of line generator 700 depicted in FIG. 7A. Line generator 700 represents one of the line generator 105, line generator 506, line generator 611, as depicted in FIGS. 1B, 5, and 6. As shown in FIGS. 7A and 7B, line generator 700 comprises a collimating optics 702, a slicing and rotating optics 703, a homogenization optics 704 and a focusing optics 705. As shown in FIG. 7A, an optical fiber 701 provides a beam 707 from an input laser (not shown) to a collimating optics 702. In an embodiment, the collimating optics comprises one or more collimating lenses. Collimating optics 702 collimates the beam 707, and a slicing and rotating optics 703 slices the collimated beam into a plurality of beamlets and then rotates the beamlets to form a beam having a cross-section shaped as a rough line. In an embodiment, the slicing and rotating optics comprises prisms for slicing and rotating, and solid optical barriers. A homogenization optics 704 homogenizes the rough line. In an embodiment, the homogenization optics comprises lenticular lenses that function as a homogenizer. A focusing optics 705 is configured to control the line to provide an output laser beam 706. In an embodiment, the focusing optics comprises one or more cylindrical lenses. The cross-section of the output laser beam 706 has the shape of a long and narrow rectangle ("line"). That is, the line generator shapes the cross-section of the laser beam into a line.

In one embodiment, a round shaped laser beam from a fiber coupled input laser is first collimated and then sliced into several beamlets by the slicing optics. The beamlets are then rotated by 90 degrees and placed side by side by the rotating optics to produce a rough line of laser light. Homogenization optics produce a narrow line of light with nearly uniform intensity. Focusing objects further control the width and length of the linear beam and ensure that the beam will retain this width and length for a long distance, as opposed to just at one single point in space. Proper selection of the homogenization and focusing optics can produce lines of up to about 400 mm in length and down to about 10 μm in width.

In another embodiment, the line generating system comprises a combination of collimating optics and pairs of cylindrical lenses. The collimating optics produce a beam that has circular symmetry and does not expand or compress in size as it propagates. Cylindrical lenses have the property of focusing or expanding a beam in only the vertical or horizontal direction depending on the orientation of the lens. In an embodiment, to convert the circular beam into a line-shaped beam, a pair of cylindrical lenses is used for each direction to expand or compress the beam in that direction to the desired dimension. To expand the beam along the horizontal direction, corresponding to the width of the image chamber or the length of the linear beam, two cylindrical lenses are oriented with their axes in the vertical direction. The two lenses are separated by a distance equal to the sum of their focal lengths. To expand the beam, the focal length of the second lens is larger than the focal length of the first lens. To compress the beam along the vertical direction, corresponding to the depth direction in the image chamber or the width of the linear beam, two cylindrical lenses are oriented with their axes in the horizontal direction. The same positioning of the lenses with respect to each other is used except that the focal length of the first lens is now larger than the focal length of the second lens. Ideally the processing of the beam in the horizontal direction and in the vertical direction are independent and do not change the parameters of the beam in the orthogonal direction. A challenge in this design is to ensure that the beam emitted from the final lens of the system remains collimated or very nearly collimated for the entire height of the image chamber. Precise alignment of the lens axes and the lens positions is required to achieve both the independence in processing and the collimation throughout the image chamber.

In an embodiment, the width of the linear beam along the depth of the image chamber (e.g., depth 119) produced by the line generating system is critical to the functioning of the display for two reasons. First, the width of the linear beam determines the depth of each voxel in the display, and thus affects the minimum resolution in the depth domain that can be achieved by the display. A narrower beam allows slices to be placed closer together, and this in turn allows the original image to be divided into a large number of slices along the depth dimension. More slices allows for higher fidelity rendering of features along the depth dimension which produces a higher resolution image overall. Second, the area of the linear beam directly determines the optical power density delivered to the slice of the image chamber. For a given total average power available from the addressing laser, the power density delivered to the slice is given simply by the total average power divided by the area of the linear beam. In an embodiment, for large image chambers, where the length of the beam is large, a very small beam width keeps the area of the beam very small and thus the power density very high.

The upconversion efficiency of the TFTS process is known to be directly proportional to the power density of both the addressing and imaging beams. Therefore, maintaining a very narrow beam width provides higher optical emission from the voxels and thus a brighter image for the same driving optical power.

In an embodiment, the beam scanning system that meets the requirements of maintaining beam direction and size and high resolution along the depth dimension is a polygon scanner.

Figure 8:
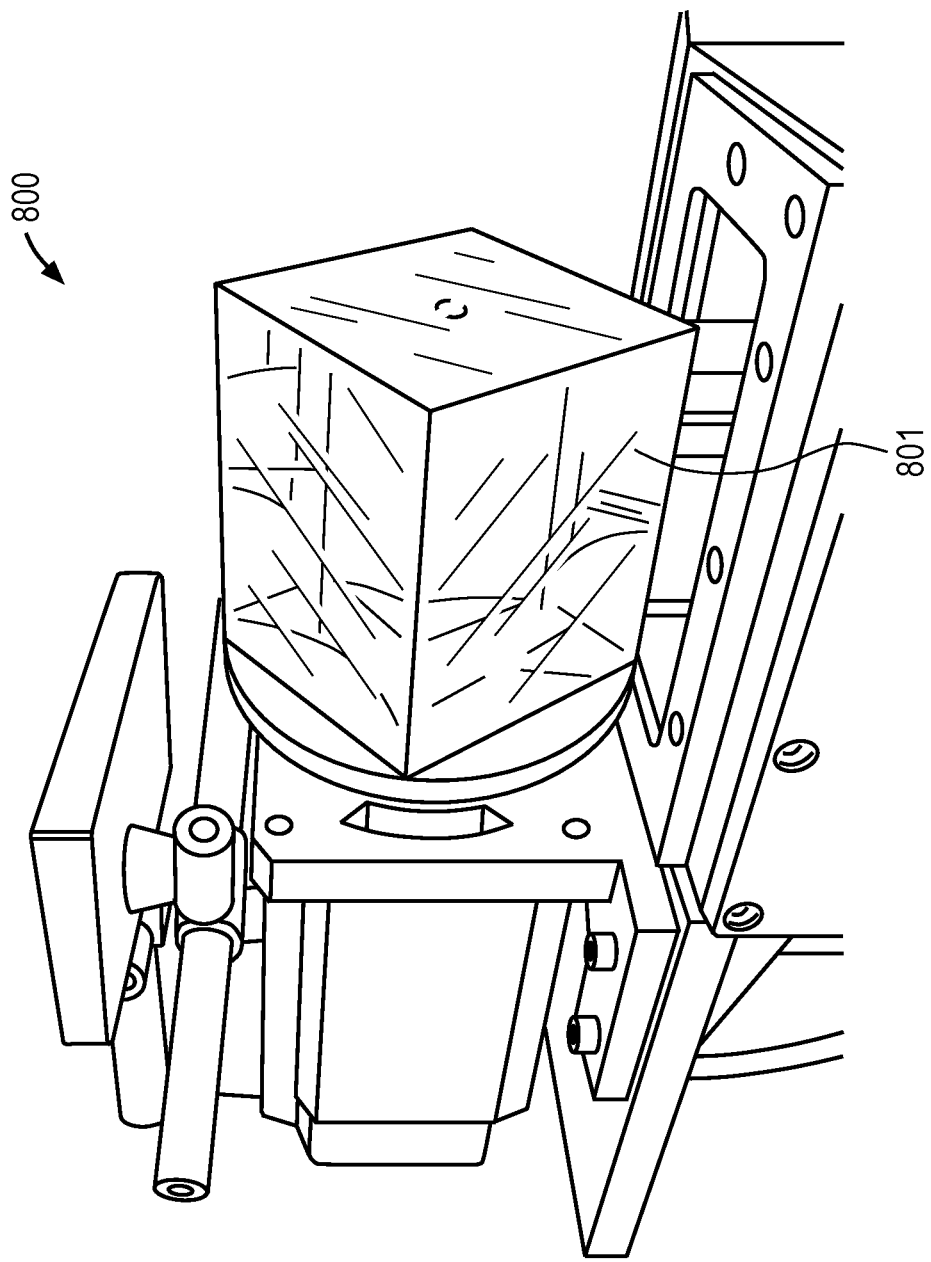
FIG. 8 is a view of an exemplary embodiment of a polygon scanner.

FIG. 8 is a view of an exemplary embodiment of a polygon scanner 800. Polygon scanner 800 comprises a polygon-shaped prism 801 that is rotated at a constant rotational velocity, as shown in FIG. 8. In one embodiment, polygon scanner system 800 represents one of the beam scanning systems 108, 507, and 612, as depicted in FIGS. 1B, 5, and 6. In another embodiment, a polygon scanner comprises a polygon shaped mirror that is rotated at a constant rotational velocity. In an embodiment, the linear addressing beam enters the prism from the bottom of FIG. 8 and passes through the prism and into the image chamber at the top. As the prism 801 rotates, the deflection of the beam along the depth dimension changes due to changes in the angle of beam propagation with respect to the surfaces of the prism and the changes in the path length traveled through the prism to reach the top surface. In an embodiment, the dimensions and angles of the prism surfaces are carefully chosen to make sure that translation along the depth dimension is linear with respect to the rotation angle of the prism so that the prism can be rotated at a constant speed. The use of a constant speed makes the control of the rotating motor and thus the angle of the prism much easier and more repeatable. A polygon shaped mirror works in a similar manner, except that the light is translated by reflections from the mirror surfaces rather than by refraction from the surfaces of the prism.

In an embodiment, to perform the scanning, the prism or mirror is mounted on the axle of a rotational motor. In an embodiment, the motor is an analog (continuous motion) motor. In another embodiment, the motor is digital (rotation is carried out in discrete steps) motor. In an embodiment, the motor has sufficient torque to accommodate the mass of the mirror or prism mounted on its axle. In an embodiment, the motor combined with the scanning mirror or prism is designed together so that the linear addressing beam can be scanned over the entire depth of the image chamber at least 30 times per second with enough resolution in depth to address all of the image slices during each scan. In an embodiment, the scan rate of at least 30 times per second is set according to the functioning of the human visual system, for which a rate of 30 frames per second or larger produces the illusion of a continuously persistent image without flicker for static images and the illusion of fluid, continuous motion as well for moving images. The rotational speed of the motor (in rotations per minute or rpm) and the deflection achieved versus rotation angle of the scanning prism or mirror determine the time needed to move the linear addressing beam one slice in depth.

Control Systems

In an embodiment, the systems that control the operation of the three-dimensional display comprises hardware systems, software systems, and synchronization systems. In an embodiment, the hardware systems include the electronics that control the lasers and switch arrays, the motor that controls the scanning prism or mirror, and the motor driver. In an embodiment, the software systems include the image processing (import, formatting, and configuration) and base synchronization systems. In an embodiment, the synchronization systems deliver and control triggering signals to the imaging and/or scanning systems. The objectives of the control systems are to ensure that properly formatted image data is available to the imaging and addressing systems and that the correct imaging data is presented at the corresponding image slice at all times.

Hardware

In an embodiment, there are several electronic components that are responsible for controlling the operation of the three dimensional display and the image generation process. The first of these are the laser drivers that control the operation of the addressing and imaging lasers. These electronics include a current driver that is responsible for stabilizing the power of laser, so that a consistant power is available to the imaging and addressing systems; and a cooling system that prevents the laser system from overheating, especially under high power operation. The second electronic system is the cooling systems for the switch arrays. Under typical operating conditions, the optical power incident on the switch arrays is sufficiently large to heat the arrays, regardless of whether the power is being sent to the image chamber or not.

In an embodiment, any optical power that is directed by the switches away from the image chamber is dumped at some physical location, and typically this is the walls of the housing in which the switch array is located. In an embodiment, electronic systems drive the devices that cool both the switch array and the housing and provide the feedback signals that provide temperature information to the cooling devices. The cooling devices may also be electronic in nature, including but not limited to thermo-electric coolers and fans. The third electronic system is the electronic interface between the controlling computer and the electronic boards within the display. These include interfaces with the driving board for the switch array and the driving board for the scanning motor. The electronic interfaces ensure that the control signals from the computer are presented in the proper format and communication standards for interpretation by the respective boards.

The motor which drives the scanning mirror or prism may be one of several types of motors, as long as certain performance criteria are met. Possible motors include a standard AC motor, a stepping motor, a DC motor, or a servo motor. Whichever motor is used, the motor has sufficient torque to accommodate the mass of the mirror or prism mounted on its axle such that the mirror or prism can be rotated at sufficiently high speeds to meet the minimum scan rate of 30 scans of the entire image chamber per minute. In an embodiment, the construction of the motor allows for precise control of the rotational velocity (in rotations per minute). In an embodiment, for stepping motors, the step resolutions is sufficiently small that the spacing between slices in the depth dimension can be realized, and ideally the step resolution will allow adaptation of the slice spacing to different image generation requirements.

In an embodiment, the motor driver associated with the scanning motor provides sufficient control capabilities to make full use of the capabilities and resolution of the scanning motor. In an embodiment, the driver provides sufficient current/voltage to the motor for any of the motor types that may be used. In an embodiment, for analog motors, the driver provides sufficient resolution in the control of the current or voltage to subsequently control the rotational velocity of the motor within the tolerances needed for accurate operation of the display. In an embodiment, for digital motors such as the stepper motor, the motor driver provides the appropriate signaling to control and manage the stepping of the motor between the positions of sequential slices of the image within the image chamber.

Software

In an embodiment, a first function of the software systems is to import three-dimensional images and image data from a plurality of possible sources and convert the images or image data into the format required by the display. The software receives files from computer aided drawing (CAD) programs, other drawing programs, documents containing image data, and from any of a number of sources that produce numerical data of a three dimensional nature, including but not limited to medical imagers, scientific modeling programs, and radars. The software contains modules or routines suited to deconstructing the data formats from each of these sources and reconstructing the data into the format required by the three-dimensional display. In an embodiment, the output format comprises the location and number of the vertical slices through the image and the corresponding voxels that are illuminated within each slice so that the image can be regenerated within the image chamber. The number of slices and the number of voxels within each slice are determined by the scanning and imaging system capabilities and are known to the software through the interface electronics described previously. The software then packages the scanning and imaging information in the format required for communicating this information to the respective drive electronics.

A second function of the software systems is to synchronize the delivery of the imaging and scanning information to the respective drive electronics. The software ensures that the imaging data for each slice is transmitted at the proper time to allow for the data to be processed and delivered to the switch array at the appropriate time. The software also sends out triggering signals to the synchronization systems for the purpose of synchronizing the operation of the imaging and scanning systems.

Synchronization

In an embodiment, the synchronization system takes in the synchronization signal from the software and delivers triggering signals to the appropriate components. Three possible configurations may be used to perform the synchronization. In the first configuration, the electronics that drive the switch array trigger the electronics that drive the scanning system. When the switch array is prepared to deliver the voxel information to the next slice of the three-dimensional image, a trigger signal is sent to the scanning system to advance the laser output from the addressing system to the next slice position within the image chamber. The timing of the trigger signal is determined by the expected delay as the signal travels to the motor control electronics, is processed, and is acted upon by the motor. In the second configuration, the reverse process occurs where the scanning system triggers the switch array. In this configuration, the electronics controlling the motor send a trigger signal when the motor is ready to advance the laser output from the addressing system to the next slice position within the image chamber. The trigger signal advises the electronics controlling the switch array to deliver the new voxel data from the software to the image chamber. The timing of the trigger signal is determined by the expected delay as the signal travels to the electronics controlling the switch array, is processed, and is acted upon by the switch array. In the third configuration, a programmable logic control (PLC) system or equivalent takes the trigger signal from the software and delivers two separate triggering signals with the proper delays to both the scanning system controller and the switch array controller. Using a PLC allows for fine tuning of the timing of the trigger signals and thus allows fine control over the timing between the arrival of the addressing layer power to the slice and the arrival of the optical power from the imaging system.

Figure 9:
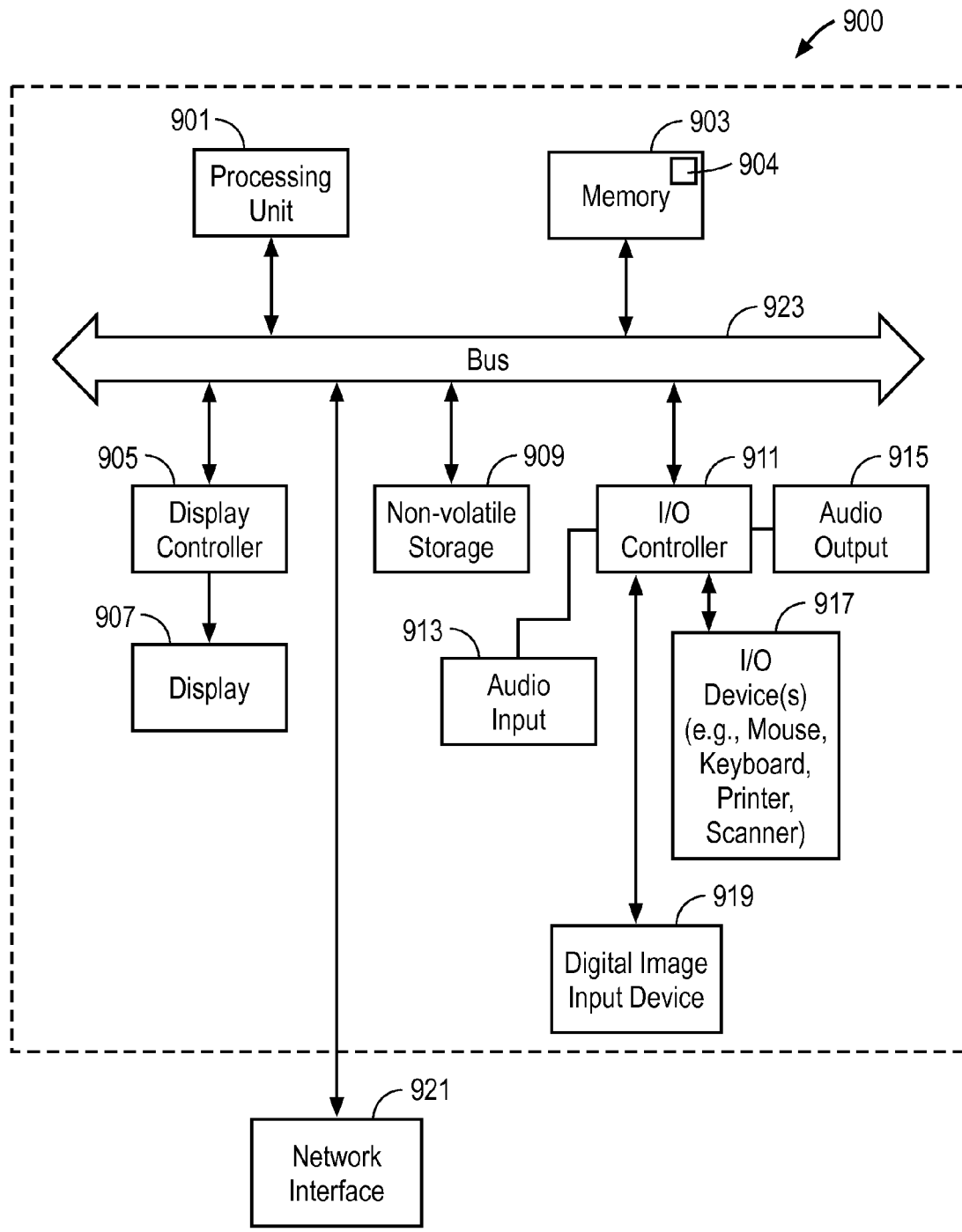
FIG. 9 shows a block diagram of an exemplary embodiment of a data processing system to provide an ultra high-resolution volumetric 3D display system as described herein.

FIG. 9 shows a block diagram of an exemplary embodiment of a data processing system 900 to provide an ultra high-resolution volumetric 3D display system as described herein. Data processing system 900 can represent control system 104, as depicted in FIGS. 1A and 1B. In an embodiment, data processing system 900 is a part of the control system to perform a method that includes directing a beam of electromagnetic energy at a first wavelength to slice through an image chamber along a first axis to provide an image slice; shaping the beam into a line extended along a second axis, and delivering the electromagnetic energy at a second wavelength to an area within the provided image slice, wherein the line is moved along a third axis to form a three dimensional (3D) image, as described herein.

Data processing system 900 includes a processing unit 901 that may include a microprocessor or microprocessor, such as Intel microprocessor (e.g., Core i7, Core 2 Duo, Core 2 Quad, Atom), Sun Microsystems microprocessor (e.g., SPARC), IBM microprocessor (e.g., IBM 750), Motorola microprocessor (e.g., Motorola 68000), Advanced Micro Devices ("AMD") microprocessor, Texas Instrument microcontroller, and any other microprocessor or microcontroller.

Processing unit 901 may include a personal computer (PC), such as a Macintosh® (from Apple Inc. of Cupertino, Calif.), Windows®-based PC (from Microsoft Corporation of Redmond, Wash.), or one of a wide variety of hardware platforms that run the UNIX operating system or other operating systems. For at least some embodiments, processing unit 901 includes a general purpose or specific purpose data processing system based on Intel, AMD, Motorola, IBM, Sun Microsystems, IBM processor families, or any other processor families. As shown in FIG. 9, memory 903 is coupled to the processing unit 901 by a bus 923. Memory 903 has instructions and data 904 stored thereon which when accessed by processing unit 901 cause the processing unit 901 to perform remote application provisioning methods, as described herein.

Memory 903 can be dynamic random access memory ("DRAM") and can also include static random access memory ("SRAM"). A bus 923 couples processing unit 901 to the memory 903 and also to non-volatile storage 909 and to display controller 905 (if a display is used) and to the input/output (I/O) controller(s) 911. Display controller 905 controls in the conventional manner a display on a display device 907 which can be a cathode ray tube (CRT), liquid crystal display (LCD), or any other display device. The input/output devices 917 can include a keyboard, disk drives, printers, a scanner, a camera, and other input and output devices, including a mouse or other pointing device. The I/O controller 911 is coupled to one or more audio input devices 913, for example, one or more microphones.

The display controller 905 and the I/O controller 911 can be implemented with conventional well known technology. An audio output 915, for example, one or more speakers may be coupled to an I/O controller 911. The non-volatile storage 909 is often a magnetic hard disk, an optical disk, or another form of storage for large amounts of data. Some of this data is often written, by a direct memory access process, into memory 903 during execution of software in the data processing system 900 to perform methods described herein.

One of skilled in the art will immediately recognize that the terms "computer-readable medium" and "machine-readable medium" include any type of storage device that is accessible by the processing unit 901. A data processing system 900 can interface to external systems through a modem or network interface 921. It will be appreciated that the modem or network interface 921 can be considered to be part of the data processing system 900. This interface 921 can be an analog modem, ISDN modem, cable modem, token ring interface, satellite transmission interface, or other interfaces for coupling a data processing system to other data processing systems.

It will be appreciated that data processing system 900 is one example of many possible data processing systems which have different architectures. For example, personal computers based on an Intel microprocessor often have multiple buses, one of which can be an input/output (I/O) bus for the peripherals and one that directly connects the processing unit 901 and the memory 903 (often referred to as a memory bus). The buses are connected together through bridge components that perform any necessary translation due to differing bus protocols.

Network computers are another type of data processing system that can be used with the embodiments as described herein. Network computers do not usually include a hard disk or other mass storage, and the executable programs are loaded from a network connection into the memory 903 for execution by the processing unit 901. A typical data processing system will usually include at least a processor, memory, and a bus coupling the memory to the processor.

It will also be appreciated that the data processing system 900 can be controlled by operating system software which includes a file management system, such as a disk operating system, which is part of the operating system software. Operating system software can be the family of operating systems known as Macintosh® Operating System (Mac OS®) or Mac OS X® from Apple Inc. of Cupertino, Calif., or the family of operating systems known as Windows® from Microsoft Corporation of Redmond, Wash., and their associated file management systems. The file management system is typically stored in the non-volatile storage 909 and causes the processing unit 901 to execute the various acts required by the operating system to input and output data and to store data in memory, including storing files on the non-volatile storage 909.

In various embodiments, hardwired circuitry may be used in combination with software instructions to implement methods described herein. A non-transitory machine readable medium can be used to store software and data which when executed by a data processing system causes the system to perform various methods described herein. This executable software and data may be stored in various places including for example ROM, volatile RAM, non-volatile memory, and/or cache. Portions of this software and/or data may be stored in any one of these storage devices.

Thus, a machine readable medium includes any mechanism that provides (i.e., stores and/or transmits) information in a form accessible by a machine (e.g., a computer, network device, or any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods as described herein can be implemented using dedicated hardware (e.g., using Field Programmable Gate Arrays, or Application Specific Integrated Circuit) or shared circuitry (e.g., microprocessors or microcontrollers) under control of program instructions stored in a machine readable medium. The methods as described herein can also be implemented as computer instructions for execution on a data processing system, such as system 900 of FIG. 9.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A three-dimensional (3D) display system, comprising:
    an image chamber;
    an addressing system to direct a beam of electromagnetic energy at a first wavelength to slice through the image chamber along a first axis, the beam having a cross-section in a first plane perpendicular to the first axis, wherein the addressing system comprises a line generator to shape the cross-section of the beam into a line extended along a second axis in the first plane to illuminate a second plane in the image chamber to provide an image slice; and
    an imaging system delivering electromagnetic energy at a second wavelength to an area within the provided image slice, wherein the line is moved along a third axis to form a three dimensional (3D) image.

2. The 3D display system of claim 1, wherein the line generator comprises
    a collimating optics to collimate the beam;
    a slicing optics to slice the collimated beam into a plurality of beamlets;
    a rotating optics to rotate the beamlets to form the line;
    a homogenization optics coupled to the rotating optics to homogenize the line; and
    a focusing optics to control the line.

3. The 3D display system of claim 1, wherein the line generator comprises
    a collimating optics to form the beam;
    a plurality of cylindrical lenses coupled to the collimating optics to convert the collimated beam into a line-shaped beam.

4. The 3D display system of claim 1, wherein the beam is processed along the second axis independently from the first axis.

5. The 3D display system of claim 1, wherein the width of the line controls the depth of each voxel in the display.

6. The 3D display system of claim 1, wherein the addressing system comprises a polygon scanner that comprises one of a polygon shaped prism and a polygon shaped mirror to move the line along the third axis.

7. The 3D display system of claim 1, further comprising a control system to synchronize the addressing system and the imaging system.

8. The 3D display system of claim 1, wherein the image chamber comprises
    two frequency two step upconversion nanoparticle material.

9. The 3D display system of claim 1, wherein the image chamber comprises
    two frequency two step upconversion microparticle material.

10. The 3D display system of claim 1, wherein the image chamber comprises
    two frequency two step upconversion bulk crystal.

11. The 3D display system of claim 1, wherein the imaging system comprises
    a digital micromirror device, a grating light valve, a liquid crystal display, or any combination thereof.

12. A method to produce a three-dimensional image, comprising:
    directing a beam of electromagnetic energy at a first wavelength to slice through an image chamber along a first axis, wherein the beam has a cross-section in a first plane perpendicular to the first axis that is shaped into a line extended along a second axis in the first plane to illuminate a second plane in the image chamber to provide an image slice; and
    delivering the electromagnetic energy at a second wavelength to an area within the provided image slice, wherein the line is moved along a third axis to form a three dimensional (3D) image.

13. The method of claim 12, further comprising
    collimating the beam;
    slicing the collimated beam into a plurality of beamlets;
    rotating the beamlets to form the line;
    homogenizing the line; and
    controlling the line.

14. The method of claim 12, further comprising
collimating the beam; and
converting the collimated beam into a line-shaped beam.

15. The method of claim 12, further comprising
processing the beam along the second axis independent from the first axis.

16. The method of claim 12, wherein the width of the line controls the depth of each voxel in the display.

17. The method of claim 12, further comprising
move the line along the third axis using a polygon scanner.

18. The method of claim 12, further comprising
synchronizing the addressing system and the imaging system.

19. The method of claim 12, wherein the image chamber comprises
two frequency two step upconversion nanoparticle material.

20. The method of claim 12, wherein the image chamber comprises
two frequency two step upconversion microparticle material.

21. The method of claim 12, wherein the image chamber comprises
two frequency two step upconversion bulk crystal.

22. The method of claim 12, wherein the imaging system comprises
a digital micromirror device, a grating light valve, a liquid crystal display, or any combination thereof.

* * * * *